(12) United States Patent
Schmidt et al.

(10) Patent No.: US 6,210,523 B1
(45) Date of Patent: Apr. 3, 2001

(54) COMPOSITIONS USEFUL AS BINDERS FOR THE PRODUCTION OF COMPOSITE MATERIALS

(75) Inventors: Manfred Schmidt, Dormagen; Peter Vehlewald, Leichlingen; Peter Kasperek, Much; Manfred Kapps, Gladbach; Klaus König, Odenthal, all of (DE)

(73) Assignee: Bayer Aktiengesellschaft, Leverkusen (DE)

( * ) Notice: Subject to any disclaimer, the term of this patent is extended or adjusted under 35 U.S.C. 154(b) by 0 days.

(21) Appl. No.: 08/386,795

(22) Filed: Feb. 10, 1995

Related U.S. Application Data

(63) Continuation of application No. 08/271,344, filed on Jul. 6, 1994, now abandoned.

(30) Foreign Application Priority Data

| Jul. 12, 1993 | (DE) | 43 23 231 |
| Jan. 11, 1994 | (DE) | 44 00 465 |

(51) Int. Cl.[7] .................. C09J 175/06; C08G 18/68; C08G 18/76; C08L 75/06
(52) U.S. Cl. .................. 156/331.4; 156/331.7; 525/123; 525/440; 528/59; 528/60; 528/65; 528/74.5; 528/75; 528/80
(58) Field of Search ................ 528/59, 74.5, 75, 528/60, 80, 65; 525/440, 123; 156/331.4, 331.7

(56) References Cited

U.S. PATENT DOCUMENTS

| 2,769,826 | * | 11/1956 | Yoho | 528/74.5 |
| 2,983,693 | * | 5/1961 | Sievers | 528/74.5 |
| 3,870,665 | | 3/1975 | Diehr et al. | 156/328 |
| 3,875,090 | * | 4/1975 | Levy | 528/65 |
| 4,256,615 | * | 3/1981 | Legue | 524/507 |
| 4,340,682 | * | 7/1982 | Legue et al. | 524/507 |
| 4,535,142 | * | 8/1985 | Brauer et al. | 528/74.5 |
| 4,742,112 | * | 5/1988 | Brauer et al. | 528/74.5 |
| 4,812,533 | * | 3/1989 | Simone et al. | 525/437 |
| 5,198,508 | * | 3/1993 | Veda et al. | 525/454 |

FOREIGN PATENT DOCUMENTS

| 793937 | 9/1968 | (CA) . |
| 1492507 | 5/1969 | (DE) . |
| 1653178 | 11/1970 | (DE) . |
| 4114022 | 11/1992 | (DE) . |
| 0478216 | 4/1992 | (EP) . |
| 0513964 | 11/1992 | (EP) . |
| 1148016 | 4/1969 | (GB) . |
| 1387454 | 3/1975 | (GB) . |

OTHER PUBLICATIONS

Sax et al.; *Hawley's Condensed Chemical Dictionary, Eleventh Edition*; Van No strand Reinhold, New York, 1987, p. 302.*

* cited by examiner

*Primary Examiner*—Rabon Sergent
(74) *Attorney, Agent, or Firm*—Joseph C. Gil; Lyndanne M. Whalen

(57) ABSTRACT

Compositions made up of an aromatic polyisocyanate and a polyester having an average molecular weight of from about 600 to about 5000, obtainable by self-condensation of ricinoleic acid, optionally with co-utilization of a $C_2$–$C_{20}$ starter polyol and optional additives. These compositions are useful as binders for the production of composite materials.

8 Claims, No Drawings

COMPOSITIONS USEFUL AS BINDERS FOR THE PRODUCTION OF COMPOSITE MATERIALS

This application is a continuation of application Ser. No. 08/271,344 filed Jul. 6, 1994 now abandoned.

BACKGROUND OF THE INVENTION

The present invention relates to new isocyanate-based compositions useful as binders for the production of composite materials.

Composite materials (also called compression-molded materials) such as chipboards, composite boards or other molded bodies are produced by hot molding an inorganic or organic raw material such as a mass of wood chips, wood fibers, or other lignocellulose-containing material, with a binder such as an aqueous dispersion of a urea/formaldehyde resin or a phenol/formaldehyde resin. Isocyanates or isocyanate solutions may be used instead of formaldehyde resins as binders for hardboards (See, e.g., German Auslegeschrift 1,271,984; and German Offenlegungschriften 1,492,507; 1,653,177; and 2,109,686). The use of polyisocyanates as binders improves the stability and moisture characteristics of the composite materials and increases their mechanical strength. Polyisocyanates also have far-reaching process engineering advantages when used as binders. These advantages are discussed in German Offenlegungschrift 2,109,688.

The large-scale, industrial production of composite materials bonded with polyisocyanates (particularly lignocellulose-containing materials such as chipboards, fiberboards and plywood) is, however, impeded by the high adhesiveness of the polyisocyanate. This adhesiveness causes the molded composite to adhere strongly to all metal parts (especially pressing plates made of steel or aluminum) after the hot molding and makes mold release difficult.

Previously proposed methods for solving this release problem each have their disadvantages. Some of those disadvantages are greater than others. Release agents developed especially for use with isocyanates frequently have a good release action but they are unreliable in large-scale application, uneconomical and can also cause defective gluing or coating difficulties in the further processing of boards made with the release agent German Offenlegungschrift 1,653,178 discloses the production of boards or molded bodies by hot molding mixtures of lignocellulose-containing material and polyisocyanates. In the disclosed process, the pressing plates or molds may be treated with polyhydroxylic compounds (e.g.. glycerol, ethylene glycol, polyester polyols or polyether polyols) before compression molding. The fact that a separate operation is necessary for the application of the release agent and that part of the polyisocyanate is consumed by reaction with the release agent makes this process disadvantageous.

Another approach to improving the release behavior of molded bodies is disclosed in German Offenlegungschrift 2,325,926. In this disclosure, release agents which catalyze the formation of isocyanurate in the isocyanate are used. The disadvantage of this process is that the catalyst has a destabilizing effect on the isocyanate which effectively prevents production of an isocyanate binder which will satisfy a specification.

SUMMARY OF THE INVENTION

It is an object of the present invention to provide a composition which is useful as a binder for the production of composite materials.

It is also an object of the present invention to provide a binder composition which may be used for the production of composite materials which does not adversely affect the removability of a composite article from a mold.

It is a further object of the present invention to provide a binder composition which is storage stable.

It is another object of the present invention to provide a process for the production of composite materials in which the composite material may be readily removed from a mold.

These and other objects which will be apparent to those skilled in the art are accomplished by using a composition made up of (a) an aromatic polyisocyanate in combination with (b) a polyester obtained by self-condensation of ricinoleic acid, optionally with the use of a starter polyol.

DETAILED DESCRIPTION OF THE PRESENT INVENTION

The present invention provides a composition made up of (a) an aromatic polyisocyanate and (b) a polyester having an average molecular weight of from about 600 to about 5000 which polyester is obtainable by self-condensation of ricinoleic acid, optionally using a $C_2$–$C_{20}$ starter polyol, and optional additives.

In a preferred embodiment of the present invention, polyisocyanate (a) is a polyisocyanate based on (i) diphenylmethane diisocyanate or (ii) a mixture of diphenylmethane diisocyanates and polyphenylpolymethylene polyisocyanates in which the proportion of diphenylmethane diisocyanates in the polyisocyanate mixture is preferably between 35 and 75 wt %. It is also preferred that polyester (b) have an average molecular weight of from about 620 to about 3000. Where a starter polyol is used in the production of polyester (b), it is preferred that the polyol be 1,6-hexanediol. It is also preferred that components (a) and (b) have been caused to react together completely or partially, optionally not until during application of the composition to the material from which a composite material is to be made.

The present invention is also directed to the use of the above-described composition, optionally in combination with known polyhydroxylic compounds having a molecular weight of from about 400 to about 10,000, as a binder for the production of composite materials.

It is also preferred that the binder of the present invention be used to produce composite materials which are based on cellulose-containing and/or lignocellulose-containing materials. In another preferred embodiment of the invention, ground scrap plastics (most preferably isocyanate-based scrap plastics) are used together with cellulose-containing and/or lignocellulose-containing materials to produce composite materials.

In the compositions of the present invention, the weight ratio of component (a) to component (b) is usually between 100:1 and 100:200, preferably between 100:5 and 100:30.

Polyesters (b) which are preferably used in the compositions of the present invention are the polyesters obtained by self-condensation of ricinoleic acid on a $C_2$–$C_{20}$ starter polyol. The polyesters obtained are hydroxyfunctional polyesters. It is also possible, however, to use polyesters that are obtained by self-condensation of ricinoleic acid as component (b). These self-condensation polyesters have one more carboxyl group per molecule than the polyesters produced using a starter polyol.

Any of the known polyols having a functionality of from 2 to 6 and a molecular weight of from about 62 to about 399 may be used as the $C_2$–$C_{20}$ starter polyol for the production of the polyester to be used in the practice of the present invention. Specific examples of suitable starter polyols include: ethylene glycol; 1,2- and 1,3-propanediol; 1,4- and 2,3-butanediol; 1,6- and 2,5-hexanediol; 2-ethylhexanediol; 1,12-octadecanediol; 3-methyl-1,5-pentanediol; 1,8-octanediol; neopentyl glycol; 1,4-bis (hydroxymethyl) cyclohexane; 2-methyl-1,3-propanediol; glycerol; trimethylolpropane; 1,2,6-hexanetriol; 1,2,4-butanetriol; trimethylolethane; pentaerythritol; quinitol; mannitol; sorbitol; formitol; 1,4,3,6-dianhydosorbitol; methylglycoside; diethylene glycol; triethylene glycol; tetraethylene glycol and higher polyethylene glycols; dipropylene glycol and higher polypropylene glycols; and dibutylene glycol and higher polybutylene glycols.

In the production of composite materials (compression-molded materials) by hot molding using the compositions of the present invention as binders, other additives may optionally be used. Such additives include those known in the ad, e.g., polyether polyols having molecular weights of from about 400 to about 10,000 and/or alkylene carbonates (EP-0 352,558).

When the compositions of the present invention are used as binders, they make it possible to produce compression-molded materials (e.g., chipboards) by hot molding, optionally after a single conditioning of the mold by application of a release agent. Repeated application of a mold release agent is not necessary. A noticeable reduction of the molding time is also repeatedly observed.

The compositions of the present invention to be used as binders can be produced by mixing components (a) and (b) and optionally (c) at temperatures of from about 0° C. to about 300° C., preferably from about 10° C. to about 100° C. The components may even be mixed just before use or while being applied to the material from which the composite is to be produced.

Any aromatic polyisocyanate may be used as component (a) to produce the compositions of the present invention. Such isocyanates are described, for example, by W. Siefken in Justus Liebigs Annalen der Chemie 562, pp 75–136. Aromatic polyisocyanates which are liquid at room temperature are particularly preferred. Examples of suitable polyisocyanates include those represented by the formula

in which
  n represents a number of from 2 to 4, preferably 2 to 3, and
  Q represents an aromatic hydrocarbon group having from 6 to 15 (preferably from 8 to 13) carbon atoms.

Specific examples of such polyisocyanates are disclosed in German Offenlegungschrift 2,832,253 at pages 10 and 11.

Aromatic polyisocyanates which are readily available are generally preferred. Examples of commercially available polyisocyanates include: the 2,4- and 2,6-tolylene diisocyanates and mixtures of these isomers ("TDI"); polyphenylpolymethylene polyisocyanates such as those which are produced by aniline-formaldehyde condensation and subsequent phosgenation ("crude MDI"); and aromatic polyisocyanates having carbodiimide groups, urethane groups, allophanate groups, isocyanurate groups, urea groups or biuret groups ("modified polyisocyanates"). Modified polyisocyanates derived from 2,4- and/or 2,6-tolylene diisocyanate or from 4,4'- and/or 2,4'-diphenylmethane diisocyanate are most preferred.

Suitable lignocellulose-containing raw materials which can be bonded with the compositions of the present invention include: wood, bark, cork, bagasse, straw, flax, bamboo, alfalfa grass, rice husks, sisal fibers and coconut fibers. Composite materials may also be produced from other organic raw materials (e.g., plastics wastes of all kinds) and/or inorganic raw materials (e.g., expanded mica or silicate spheres) when the compositions of the present invention are used as binders. The material to be bonded can be used in the form of granules, chips, fibers, spheres or flour, and have a moisture content of from about 0 to about 35 wt %.

It is possible to apply the two components of the composition of the present invention (i.e., polyisocyanate (a) and polyricinoleic acid polyester (b)) separately to the material to be bonded, the components optionally being dissolved in an inert organic solvent (as an additive). It is preferred, however, that the polyisocyanate (a) and the polyricinoleic acid polyester (b) be caused to react together completely or partially, optionally together with additives such as polyethers having hydroxyl groups and/or alkylene carbonates and/or solvents, in a separate operation prior to being applied to the material to be bonded.

When polyisocyanate (a) is caused to react with polyester (b) in an operation separate from the bonding operation, from about 1 to about 200 parts by weight, preferably from about 5 to about 30 parts by weight, of polyricinoleic acid polyester (b) per 100 parts by weight of isocyanate (a) are generally used. Components (a) and (b) may be combined at a temperature of from about 0° to about 300° C., preferably from about 10° to about 100° C. These components need not be combined until shortly before or during application to the material to be bonded. Polyisocyanate (a) and polyester (b) may optionally be combined in the presence of an inert organic solvent such as hydrocarbon fractions. The self-releasing, binder combinations obtained are stable in storage and can be used at any time in accordance with the present invention.

From about 0.5 to about 20 wt %, preferably from about 2 to about 12 wt %, of the binder, based on the total weight of the molded body, is added to the organic and/or inorganic material to be bonded. The resultant mixture is then molded, generally under pressure and heat (e.g., from about 1 to about 150 bar and from about 70 to about 250° C.) to produce boards or three-dimensional molded bodies.

Multilayer boards or molded parts can be produced analogously from veneers, papers or fabrics by treating the layers, as described above, with the binder of the present invention and then molding them, usually at elevated temperature and elevated pressure. Temperatures are preferably maintained at from about 100 to about 250° C., most preferably from about 130 to about 200° C. The initial molding pressure is preferably between 5 and 150 bar. The pressure usually drops in the course of the molding operation to almost zero.

The compositions of the present invention may also be used as binders in combination with any of the polyhydroxylic compounds having a molecular weight of from about 400 to about 10,000 known in the art of polyurethane chemistry as an optional additive (c). Examples of such polyhydroxylic compounds include polyesters and polyethers. These polyhydroxylic acid compounds used as additives (c) are included in quantities such that NCO/OH ratio of binder to polyhydroxylic compound is between 1.2:1 and 10:1, preferably from 1.5:1 to 1:1. It is possible to charge the aromatic polyisocyanate component (a), the polyester (b) and the optional additives (c) as separate components or preferably as a reactive mixture. Such compositions have practical importance as binders in, for example, the bonding of cork meal. It is also possible to add any of the known blowing agents (on an amount of from about 0.5 to 30 wt %, relative to the total composition), and/or other additives influencing foaming or chemical reaction between polyisocyanates, lignocellulose-containing material and optionally polyhydroxylic compounds, such as stabilizers, catalysts and activators. The additives, if used, are generally included in an amount of from about 0.05 to about 10 wt %, based on the weight of the binder or impregnating agent The compositions to be used as binders in accordance with the present invention may also be combined with aqueous solutions of condensation products of formaldehyde with urea and/or melamine and/or phenol which have predominantly been used in the wood materials industry. The binders of the present invention may also be used with other less common binders and impregnating agents such as those based on latices of polyvinyl acetate or other plastics, spent sulfite liquor or tannin. In such combinations, the mixing ratio of the composition of the present invention to additional binder(s) should generally be maintained between 1:20 and 20:1, preferably between 1:5 and 5:1, parts by weight. The polyisocyanate composition of the present invention and the additional binder(s) can be charged to the material to be bonded either separately or as a mixture.

Such combinations of binders are particularly advantageous in the production of multilayer boards having special properties. The outer layers can, for example, be treated with the compositions of the present invention (alone or together with conventional binders and/or adhesives) and one or more inner layers may be treated with conventional adhesives (alone or together with the compositions of the present invention) and subsequently molded together.

The outstanding mechanical properties and advantageous behavior during moisture fluctuation of the boards and molded parts based on lignocellulose-containing raw materials produced in accordance with the present invention make them suitable for use in construction. In order to provide the boards or molded parts with the resistance to fungal attack, insect damage or the effect of fire usually required of them, any of the commercially available organic or inorganic preventive agents can be added, in pure form or as a solution, to the binder compositions of the present invention. Such preventive agents may be included in the compositions of the present invention in an amount of from about 0.05 to about 30 wt %, preferably from about 0.5 to about 20 wt %, based on the weight of the lignocellulose-containing raw materials.

Solvents which may be used in the binder compositions of the present invention include water and organic solvents such as residual oils from petroleum processing, chlorinated hydrocarbons etc. The gluing quality is usually not impaired by use of such solvents.

In contrast to boards glued with phenol-formaldehyde resin, neither salt blooming nor "color bleeding" occurs in composite materials produced in accordance with the present invention.

Considerable improvements in the production of chipboards, with regard both to mechanical properties and to process engineering, are achieved when the compositions of the present invention are used instead of the conventional binders based on phenol/formaldehyde resins or urea/formaldehyde resins. In the case of wood chipboards, when the binder of the present invention is used in the same quantity as the known phenol/formaldehyde or urea/formaldehyde resins, the bonding strength may be increased by up to 50% in addition to improvement in other mechanical properties). When the compositions of the present invention are used in a concentration which is 25 to 70% less than at which known phenol/formaldehyde resins or urea/formaldehyde resins are used, the composite material produced has a mechanical property profile which is substantially the same as that of composites made with the known resins. Optimum material properties are achieved when a composition of the present invention which is based on a mixture of diphenylmethane diisocyanates and polyphenylpolymethylene polyisocyanates is used as the binder.

Optimum properties are obtained whether or not the polyisocyanate is produced by distilling off 2,4'- and/or 4,4'-diisocyanatodiphenylmethane from crude diphenylmethane diisocyanate or from polyarylamines or by separating pure diaminodiphenylmethane from crude diaminodiphenylmethane by distillation and subsequently phosgenating the undistilled bottoms fraction so obtained.

The polyisocyanate mixture used in the compositions of the present invention preferably contains between 35 and 75 wt % of diisocyanatodiphenylmethane.

Having thus described our invention, the following examples are given as being illustrative thereof. All parts and percentages given in these examples are parts by weight and percentages by weight unless otherwise indicated.

EXAMPLES

The following polyisocyanates were used to make binder compositions (% data in wt %):

POLYISOCYANATE A 1: Diisocyanatodiphenylmethane which was distilled off from the crude phosgenation product of an aniline/formaldehyde condensate in an amount such that the distillation residue had a viscosity of 100 cP at 25° C. (binuclear content=59.7%; trinuclear content=21.3%; higher-nuclear polyisocyanates content= 19.0%).

POLYISOCYANATE A 2: Diisocyanatodiphenylmethane having a viscosity of 200 cP at 25° C. (binuclear content= 44.3%; trinuclear content=23.5%; higher-nuclear polyisocyanates content=32.2%).

POLYISOCYANATE A 3: Diisocyanatodiphenylmethane having a viscosity of 400 cP at 25° C. (binuclear content= 45.1%; trinuclear content=22.3%; higher-nuclear polyisocyanates content=32.6%).

POLYISOCYANATE A 4: Diisocyanatodiphenylmethane having a viscosity of 300 cP at 25° C. (binuclear content= 56.8%; trinuclear content=27.6%; higher-nuclear polyisocyanates content=15.6%).

POLYISOCYANATE A 5: An isocyanate mixture made up of 80% 4,4'-diisocyanatodiphenylmethane, 10% 2,4'-diisocyanatodiphenylmethane and 10% higher-nuclear polyisocyanate.

POLYISOCYANATE A 6: An isocyanate mixture with a content of approximately 45% 4,4'- and 55% 2,4'-diphenylmethane diisocyanate.

POLYISOCYANATE A 7: Pure monomeric 4,4'-diphenylmethane diisocyanate.

POLYISOCYANATE A 8: A semiprepolymer having an NCO content of approximately 23%, obtained by reaction of POLYISOCYANATE A 7 with technical tripropylene glycol.

POLYISOCYANATE A 9: An isocyanate mixture made up of approximately 80% tolylene 2,4-diisocyanate and 20% tolylene 2,6-diisocyanate.

The polyricinoleic acid polyesters used to produce compositions in accordance with the present invention were prepared by a conventional ester condensation procedure (See, e.g., EP-180,749) at elevated temperatures and with simultaneous removal of water, optionally with use of conventional catalysts.

The following polyesters were made:

POLYESTER B 1: Reaction product of 1 mole of 1,6-dihydroxyethane and 7 moles of ricinoleic acid (commercially available under the name Nouracid CS 80 from Akzo GmbH). OH number=approximately 35; viscosity (25° C.)=920 mPa·s.

POLYESTER B 2: Self-condensation product of 4 moles of ricinoleic acid. OH number=approximately 51; viscosity (25° C.)=820 mPa·s.

POLYESTER B 3: Condensation product of 1 mole of 1,6-hexanediol and 2 moles of ricinoleic acid. OH number=147; viscosity (25° C.)=300 mPa·s.

POLYESTER B 4: Condensation product of 1 mole of 1,6-hexanediol and 14 moles of ricinoleic acid. OH number=approximately 27.7; viscosity (25° C.)=1480 mPa·s.

POLYESTER B 5: Condensation product of 1 mole of ethylene glycol and 7 moles of ricinoleic acid. OH number=approximately 39; viscosity (25° C.)=1000 mPa·s.

POLYESTER B 6: Condensation product of 1 mole of 1,12-octanediol and 7 moles of ricinoleic acid. OH number=approximately 28; viscosity (25° C.)=900 mPa·s.

POLYESTER B 7: Condensation product of 1 mole of diethylene glycol and 6.75 moles of ricinoleic acid. OH number=approximately 34; viscosity (25° C.)=920 mPa·s.

POLYESTER B 8: Reaction product of 1 mole of trimethylolpropane and 10.5 moles of ricinoleic acid. OH number=approximately 44; viscosity (25° C.)=1560 mPa·s.

POLYESTER B 9: Reaction product of 1 mole of diethylene glycol and 2 moles of ricinoleic acid. OH number=149; viscosity (25° C.)=260 mPa·s.

POLYESTER B 10: Reaction product of 1 mole of tetraethylene glycol and 2 moles of ricinoleic acid. OH number=139; viscosity (25° C.)=240 mPa·s.

Binder compositions were prepared from the above-listed POLYISOCYANATES AND POLYESTERS by stirring a POLYISOCYANATE and a POLYESTER at elevated temperature in accordance with known techniques. Acidic additives (optional additives (c)) were used, if necessary, for stabilization. It is also possible to mix the components A and B shortly before, or not until during, application to the material to be bonded. The binder compositions made were as follows:

COMPOSITION C 1 (according to the invention): 881.2 kg of POLYISOCYANATE A1 were caused to react with 128.8 kg of POLYESTER B1 for 2 hours at 80° C. NCO content=27.1%; viscosity (25° C.)=350 mPa·s.

COMPOSITION C 2 (according to the invention): POLYISOCYANATE A1 and POLYESTER B4 were mixed shortly before application in a ratio of 6.8:1 and used immediately.

COMPOSITION C 3 (according to the invention): POLYISOCYANATE A1 and POLYESTER B5 were mixed shortly before application in a ratio of 6.8:1 and used immediately.

COMPOSITION C 4 (according to the invention): POLYISOCYANATE A1 and POLYESTER B6 were mixed shortly before application in a ratio of 6.8:1 and used immediately.

COMPOSITION C 5 (according to the invention): 8.47 kg of POLYISOCYANATE A1 were mixed with 1.23 kg of POLYESTER B2 for 2 hours at 80° C. NCO content=26.7%; viscosity (25° C.)=610 mPa·s.

COMPOSITION C 6 (according to the invention): 5 kg of POLYISOCYANATE A1 were mixed with 5 kg of POLYESTER B1 for 2 hours at 80° C. NCO content=14.2%; viscosity (25° C.)=3120 mPa·s.

COMPOSITION C 7 (according to the invention): 2.25 kg of POLYISOCYANATE A1 were mixed with 4.5 kg of POLYESTER B1 for 2 hours at 80° C. NCO content=8.2%; viscosity (25° C.)=9600 mPa·s.

COMPOSITION C 8 (according to the invention): 9 kg of POLYISOCYANATE A5 were mixed with 1 kg of POLYESTER B1 for 2 hours at 80° C. NCO content=28.7%; viscosity (25° C.)=45 mPa·s.

COMPOSITION C 9 (comparison): 4.5 kg of POLYISOCYANATE A1 were stirred with 0.66 kg oleic acid for 2 hours at 80° C. and 1 hour at 100° C. NCO content=26.1%; viscosity (25° C.)=560 mPa·s.

COMPOSITION C 10 (comparison): 4.5 kg of POLYISOCYANATE A1 were stirred with 0.66 kg tall oil for 2 hours at 80° C. and 1 hour at 100° C. NCO content=26.2%; viscosity (25° C.)=535 mPa·s.

COMPOSITION C 11 (according to the invention): 9 kg of POLYISOCYANATE A 9 were stirred with 1 kg of POLYESTER B1 at 80° C. NCO content=42.8%; viscosity (25° C.)=6.1 mPa·s.

EXAMPLES OF APPLICATION

Example 1 According to the Invention 4060 g of industrially produced outer-layer softwood chips with a moisture content of 15% were mixed with 282 g of each of the COMPOSITIONS identified in Table 1 in a laboratory gluing machine. A briquette was formed from the glued chips on a steel cover plate, then provided with another steel cover plate on the top, and molded for 1.6 min. in a hot press at a hot-plate temperature of 180° C. and an initial pressure of 25 bar.

A chipboard which was satisfactorily separated from the cover plates was obtained. After the fourth repetition, the composite had "outstanding" release properties (i.e. there was no resistance to demolding).

Example 1a Comparison

Production of a chipboard with an unmodified isocyanate (PMDI) by the process described in Example 1 was attempted. In contrast to Example 1, the cover plates adhered so strongly to the chipboard that the cover plates could not be removed without destruction of the chipboards. (Table 1, Experiment No. 5).

Example 1b Comparison

Products with "release properties" described in the patent literature were examined analogously to Comparative Example 1a (Table 1, Experiment Nos. 6 and 7). The results were the same as those of Example 1a.

Example 2 According to the Invention 2990 g wheat straw chips with a moisture content of 15% produced under laboratory conditions were processed with 208 g of COMPOSITION C1 by the same procedure which was used in Example 1. Straw chipboard which could be satisfactorily separated from the mold initially and after the fourth repetition outstandingly was produced.

Example 3 According to the Invention

The steel cover plates of the mold were provided before molding with a cured separating film by application of a mold coating agent Examples 1 and 2 were then repeated.

Outstanding mold-release behavior was achieved from the start onwards. The outstanding mold-release behavior of the products of the present invention continued to be achieved even after disappearance of the releasing film.

Example 4 According to the Invention

Examples 1, 1a, 2 and 3 were repeated using a mold made with aluminum cover plates instead of steel. The results were the same as those obtained when steel plates were used.

Example 5

Three-ply 16 mm wood chipboards were made from industrially produced outer-ply and middle-ply chips and COMPOSITION C1 (according to the invention; Table 2) in combination with a mold coating agent as release agent for comparison, chipboards were produced from outer-ply and middle-ply chips and an unmodified isocyanate (PMDI) in combination with a mold coating agent as release agent. The properties of the resulting chipboards were determined in accordance with DIN 68 763. The board bonded with COMPOSITION C 1 had mechanical properties that were fully equivalent to those of the comparative board (Table 2).

Example 6

Example 5 was repeated using wheat straw outer-ply and middle-ply chips which had been produced under laboratory conditions instead of wood chips. The results are reported in Table 2.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A process for the production of a composite material comprising
    a) combining material to be bonded with a composition comprising 1) an aromatic polyisocyanate and 2) a polyester having an average molecular weight of from 600 to about 5000 obtained by self-condensation of ricinoleic acid alone or by condensation of ricinoleic acid with a $C_2$–$C_{20}$ starter polyol, and optionally 3) an additive and
    b) molding or compressing the product of a) at a temperature of from about 180 to about 250° C.

2. The process of claim 1 in which a polyhydroxylic compound having a molecular weight of from about 400 to about 10,000 is also combined with the material to be bonded in step a).

3. The process of claim 2 in which the material to be bonded is a cellulose-containing and/or lignocellulose-containing material.

4. The process of claim 3 in which the material to be bonded further includes ground scrap plastic.

5. The process of claim 4 in which the plastic is an isocyanate-based plastic.

6. The process of claim 1 in which the material to be bonded is cellulose-containing and/or lignocellulose-containing material.

7. The process of claim 6 in which the material to be bonded further includes ground scrap plastic.

8. The process of claim 7 in which the plastic is an isocyanate-based plastic.

TABLE 1

| NUMBER | COMPOSITION | SEPARATION BEHAVIOR |
|---|---|---|
| 1 | C1 | Satisfactory for first 3 pressings; outstanding from 4th pressing on |
| 2 | C2 | Satisfactory for first 3 pressings; outstanding from 4th pressing on |
| 3 | C3 | Satisfactory for first 3 pressings; outstanding from 4th pressing on |
| 4 | C4 | Satisfactory for first 3 pressings; outstanding from 4th pressing on |
| 5 (Example 1a) | Polyisocyanate A1 | Very strong adhesion; chipboard could not be removed without destruction |
| 6 (Example 1b) | C9 | Very strong adhesion; chipboard could not be removed without destruction |
| 7 (Example 1b) | C10 | Very strong adhesion; chipboard could not be removed without destruction |

TABLE 2

| Material to be bonded | Binder | Amount of Binder (% adc)** | Molding Temp. (° C.) | Molding Time (min.) | Transver. Tensile Strength*** (MPa) V 20 | Transver. Tensile Strength (MPa) V 100 |
|---|---|---|---|---|---|---|
| wood chips | COMP. C1 | 5 | 180 | 2.4 | 0.76 | 0.16 |
| wood chips | unmod. PMDI A1* | 5 | 180 | 2.4 | 0.74 | 0.16 |
| wheat straw chips | COMP. C1 | 5 | 180 | 6.5 | 0.36 | 0.06 |
| wheat straw chips | unmod. PMDI A1* | 5 | 180 | 6.5 | 0.30 | 0.05 |

*unmodified PMDI A1 = POLYISOCYANATE A1
**% adc = approximate wt % (based on the weight of absolutely dry chips)
***apparent density of the board was approximately 620 kg/m³